(12) United States Patent
Salvador et al.

(10) Patent No.: US 9,153,231 B1
(45) Date of Patent: Oct. 6, 2015

(54) ADAPTIVE NEURAL NETWORK SPEECH RECOGNITION MODELS

(71) Applicant: Amazon Technologies, Inc., Reno, NV (US)

(72) Inventors: Stan Weidner Salvador, Tega Cay, SC (US); Frederick Victor Weber, New York, NY (US)

(73) Assignee: Amazon Technologies, Inc., Reno, NV (US)

( * ) Notice: Subject to any disclaimer, the term of this patent is extended or adjusted under 35 U.S.C. 154(b) by 228 days.

(21) Appl. No.: 13/836,141

(22) Filed: Mar. 15, 2013

(51) Int. Cl.
| | |
|---|---|
| *G10L 15/00* | (2013.01) |
| *G10L 15/16* | (2006.01) |
| *G10L 15/065* | (2013.01) |
| *G06N 3/02* | (2006.01) |

(52) U.S. Cl.
CPC .............. *G10L 15/16* (2013.01); *G10L 15/065* (2013.01); *G06N 3/02* (2013.01)

(58) Field of Classification Search
None
See application file for complete search history.

(56) References Cited

U.S. PATENT DOCUMENTS

| | | | | |
|---|---|---|---|---|
| 6,041,299 | A  * | 3/2000 | Schuster et al. | 704/232 |
| 6,224,636 | B1 * | 5/2001 | Wegmann et al. | 704/246 |
| 8,484,022 | B1 * | 7/2013 | Vanhoucke | 704/240 |
| 8,805,684 | B1 * | 8/2014 | Aleksic et al. | 704/244 |
| 2005/0091054 | A1 * | 4/2005 | Thrasher et al. | 704/254 |
| 2005/0149326 | A1 * | 7/2005 | Hogengout et al. | 704/242 |
| 2008/0091424 | A1 * | 4/2008 | He et al. | 704/240 |
| 2013/0317822 | A1 * | 11/2013 | Koshinaka | 704/244 |

OTHER PUBLICATIONS

Mikolov et al. Empirical Evaluation and Combination of Advanced Language Modeling Techniques, Interspeech, Aug. 2011.
Dahl et al. Context-Dependent Pre-Trained Deep Neural Networks for Large-Vocabulary Speech Recognition, IEEE Transactions on Audio, Speech, and Language Processing, vol. 20, No. 1, Jan. 2012.
Mikolov Statistical Language Models Based on Neural Networks, BRNO University of Technology, 2012.

* cited by examiner

*Primary Examiner* — Daniel Abebe
(74) *Attorney, Agent, or Firm* — Seyfarth Shaw LLP; Ilan N. Barzilay; Cyrus A. Miller

(57) ABSTRACT

Neural networks may be used in certain automatic speech recognition systems. To improve performance of these neural networks, they may be updated/retrained during run time by training the neural network based on the output of a speech recognition system or based on the output of the neural networks themselves. The outputs may include weighted outputs, lattices, weighted N-best lists, or the like. The neural networks may be acoustic model neural networks or language model neural networks. The neural networks may be retrained after each pass through the network, after each utterance, or in varying time scales.

20 Claims, 11 Drawing Sheets

ADAPTIVE NEURAL NETWORK SPEECH RECOGNITION MODELS

BACKGROUND

Human-computer interactions have progressed to the point where humans can control computing devices, and provide input to those devices, by speaking Computing devices employ techniques to identify the words spoken by a human user based on the various qualities of a received audio input. Such techniques are called speech recognition or automatic speech recognition (ASR). Speech recognition combined with language processing techniques may allow a user to control a computing device to perform tasks based on the user's spoken commands. Speech recognition may also convert a user's speech into text data which may then be provided to various textual based programs and applications.

Speech recognition may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

In certain devices which perform automatic speech recognition, neural networks may be used to determine what sounds/words are spoken by a user. To improve performance of these neural networks, the neural networks may be updated during runtime or substantially in real time. That is, the neural network may be updated as part of speech recognition processing rather than having to be taken offline and replaced with an updated neural network. To retrain while the neural network is online, the speech recognition output may be fed into the neural network and used by the neural network to retrain. Updating during runtime or substantially in real time may include performing the update using an utterance soon after the speech recognition is performed on that utterance. For example, after performing speech recognition, an ASR device or module may immediately send the utterance and the speech recognition output to a neural network model updater to update the weights of the neural network model. Alternatively, batching may be performed so that several utterances and corresponding speech recognition outputs are sent to the neural network model updater simultaneously. For example, a certain number of utterances or all utterances received in a given period of time may be processed together by the neural network model updater.

Figure 1:
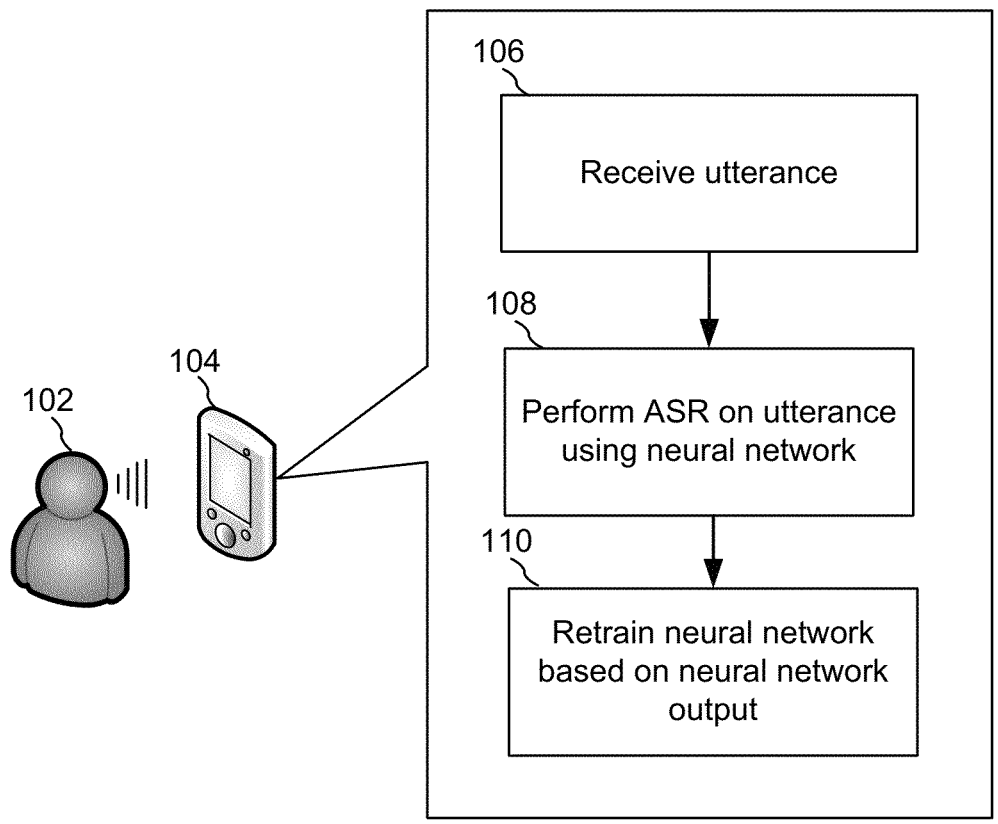
FIG. 1 illustrates performing speech recognition with adaptive neural networks according to one aspect of the present disclosure.

The speech recognition output may include multi-path outputs such as lattices, weighted N-best list, and others as explained below. This process may be formed with acoustic model neural networks as well as language model neural networks. An example of a device configured to use such adaptive neural networks is shown in FIG. 1. A user 102 inputs audio including speech utterances to a device 104. The device receives the utterance, as shown in block 106, performs ASR on the utterance using a neural network, as shown in block 108, and then retrains the neural network based on the neural network output, as shown in block 110. Further detail of this system is described below.

Figure 2:
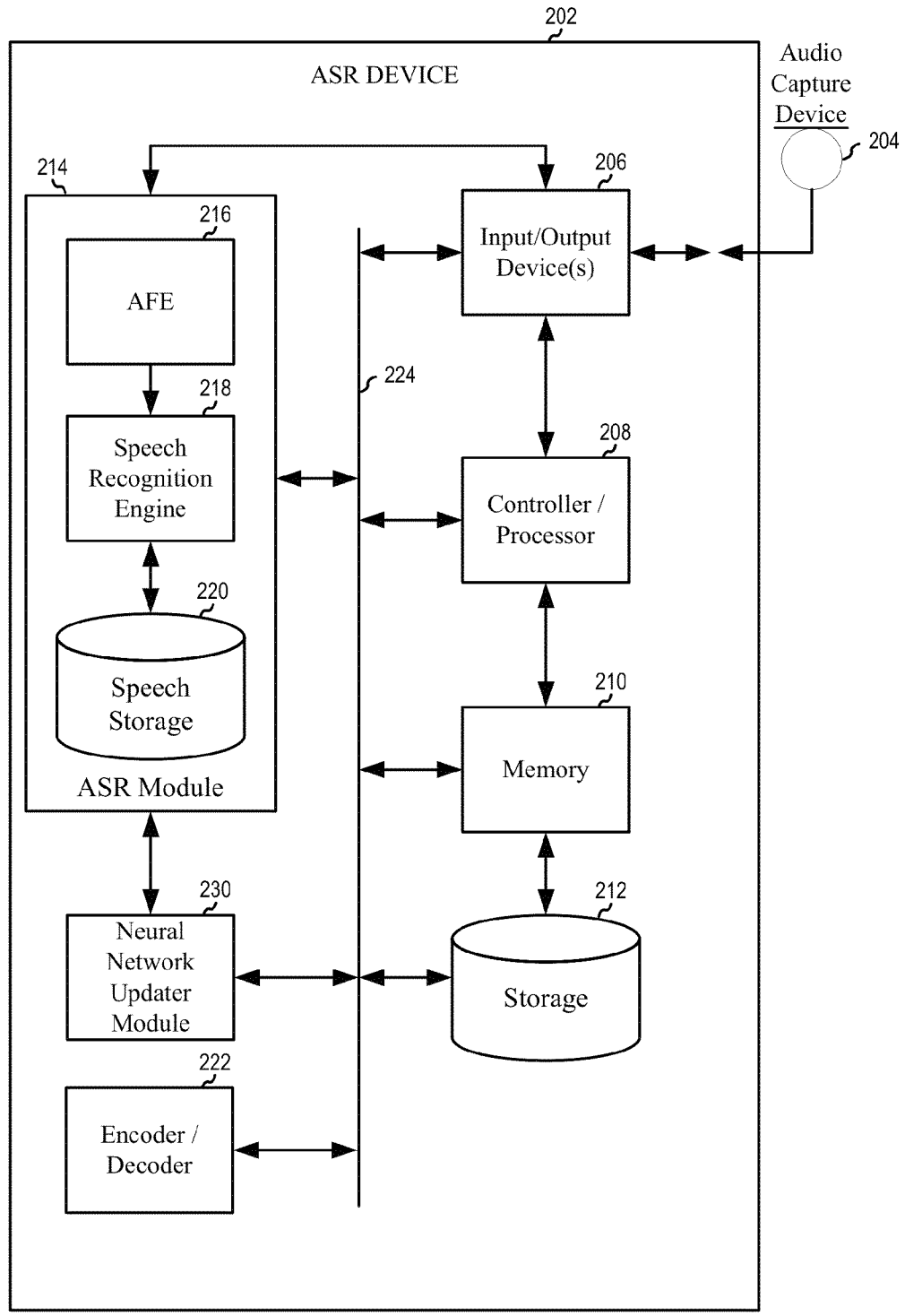
FIG. 2 is a block diagram conceptually illustrating a device for speech recognition according to one aspect of the present disclosure.

FIG. 2 shows an automatic speech recognition (ASR) device 202 for performing speech recognition. Aspects of the present disclosure include computer-readable and computer-executable instructions that may reside on the ASR device 202. FIG. 2 illustrates a number of components that may be included in the ASR device 202, however other non-illustrated components may also be included. Also, some of the illustrated components may not be present in every device capable of employing aspects of the present disclosure. Further, some components that are illustrated in the ASR device 202 as a single component may also appear multiple times in a single device. For example, the ASR device 202 may include multiple input/output devices 206 or multiple controllers/processors 208.

Multiple ASR devices may be employed in a single speech recognition system. In such a multi-device system, the ASR devices may include different components for performing different aspects of the speech recognition process. The multiple devices may include overlapping components. The ASR device as illustrated in FIG. 2 is exemplary, and may be a stand-alone device or may be included, in whole or in part, as a component of a larger device or system.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The ASR device 202 may also be a component of other devices or systems that may provide speech recognition functionality such as automated teller machines (ATMs), kiosks, home appliances (such as refrigerators, ovens, etc.), vehicles (such as cars, busses, motorcycles, etc.), and/or exercise equipment, for example.

As illustrated in FIG. 2, the ASR device 202 may include an audio capture device 204 for capturing spoken utterances for processing. The audio capture device 204 may include a microphone or other suitable component for capturing sound. The audio capture device 204 may be integrated into the ASR device 202 or may be separate from the ASR device 202. The ASR device 202 may also include an address/data bus 224 for conveying data among components of the ASR device 202.

Each component within the ASR device 202 may also be directly connected to other components in addition to (or instead of) being connected to other components across the bus 224. Although certain components are illustrated in FIG. 2 as directly connected, these connections are illustrative only and other components may be directly connected to each other (such as the ASR module 214 to the controller/processor 208).

The ASR device 202 may include a controller/processor 208 that may be a central processing unit (CPU) for processing data and computer-readable instructions and a memory 210 for storing data and instructions. The memory 210 may include volatile random access memory (RAM), non-volatile read only memory (ROM), and/or other types of memory. The ASR device 202 may also include a data storage component 212, for storing data and instructions. The data storage component 212 may include one or more storage types such as magnetic storage, optical storage, solid-state storage, etc. The ASR device 202 may also be connected to removable or external memory and/or storage (such as a removable memory card, memory key drive, networked storage, etc.) through the input/output device 206. Computer instructions for processing by the controller/processor 208 for operating the ASR device 202 and its various components may be executed by the controller/processor 208 and stored in the memory 210, storage 212, external device, or in memory/storage included in the ASR module 214 discussed below. Alternatively, some or all of the executable instructions may be embedded in hardware or firmware in addition to or instead of software. The teachings of this disclosure may be implemented in various combinations of software, firmware, and/or hardware, for example.

The ASR device 202 includes input/output device(s) 206. A variety of input/output device(s) may be included in the device. Example input devices include an audio capture device 204, such as a microphone (pictured as a separate component), a touch input device, keyboard, mouse, stylus or other input device. Example output devices include a visual display, tactile display, audio speakers, headphones, printer or other output device. The input/output device 206 may also include an interface for an external peripheral device connection such as universal serial bus (USB), FireWire, Thunderbolt or other connection protocol. The input/output device 206 may also include a network connection such as an Ethernet port, modem, etc. The input/output device 206 may also include a wireless communication device, such as radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, etc. Through the input/output device 206 the ASR device 202 may connect to a network, such as the Internet or private network, which may include a distributed computing environment.

The device may also include an ASR module 214 for processing spoken audio data into text. The ASR module 214 transcribes audio data into text data representing the words of the speech contained in the audio data. The text data may then be used by other components for various purposes, such as executing system commands, inputting data, etc. Audio data including spoken utterances may be processed in real time or may be saved and processed at a later time. A spoken utterance in the audio data is input to the ASR module 214 which then interprets the utterance based on the similarity between the utterance and models known to the ASR module 214. For example, the ASR module 214 may compare the input audio data with models for sounds (e.g., speech units or phonemes) and sequences of sounds to identify words that match the sequence of sounds spoken in the utterance of the audio data. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Based on the considered factors and the assigned recognition score, the ASR module 214 may output the most likely words recognized in the audio data. The ASR module 214 may also output multiple alternative recognized words in the form of a lattice or an N-best list (described in more detail below).

While a recognition score may represent a probability that a portion of audio data corresponds to a particular phoneme or word, the recognition score may also incorporate other information which indicates the ASR processing quality of the scored audio data relative to the ASR processing of other audio data. A recognition score may be represented as a number on a scale from 1 to 100, as a probability from 0 to 1, a log probability or other indicator. A recognition score may indicate a relative confidence that a section of audio data corresponds to a particular phoneme, word, etc.

The ASR module 214 may be connected to the bus 224, input/output device(s) 206, audio capture device 204, encoder/decoder 222, controller/processor 208 and/or other component of the ASR device 202. Audio data sent to the ASR module 214 may come from the audio capture device 204 or may be received by the input/output device 206, such as audio data captured by a remote entity and sent to the ASR device 202 over a network. Audio data may be in the form of a digitized representation of an audio waveform of spoken utterances. The sampling rate, filtering, and other aspects of the analog-to-digital conversion process may impact the overall quality of the audio data. Various settings of the audio capture device 204 and input/output device 206 may be configured to adjust the audio data based on traditional tradeoffs of quality versus data size or other considerations. The ASR module 214 may also be connected to a neural network updater module 230. Alternatively, the neural network updater module 230 may be included as part of the ASR module 214. The neural network updater module 230 may assist in ASR processing using neural networks as described below, and/or may update neural networks as described below.

The ASR module 214 includes an acoustic front end (AFE) 216, a speech recognition engine 218, and speech storage 220. The AFE 216 transforms audio data into data for processing by the speech recognition engine 218. The speech recognition engine 218 compares the speech recognition data with the acoustic, language, and other data models and information stored in the speech storage 220 for recognizing the speech contained in the original audio data. The AFE 216 and speech recognition engine 218 may include their own controller(s)/processor(s) and memory or they may use the controller/processor 208 and memory 210 of the ASR device 202, for example. Similarly, the instructions for operating the AFE 216 and speech recognition engine 218 may be located within the ASR module 214, within the memory 210 and/or storage 212 of the ASR device 202, or within an external device.

Figure 3:
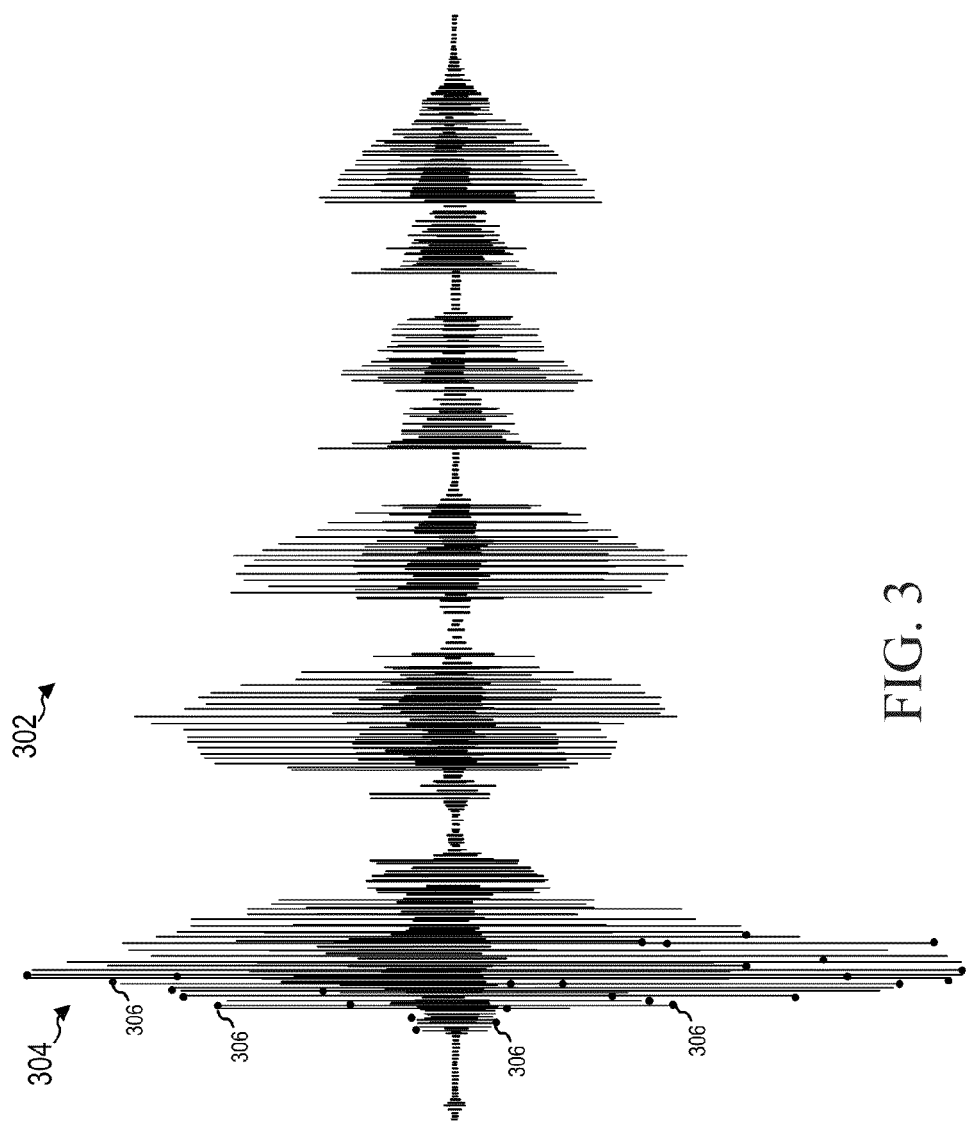
FIG. 3 illustrates an audio waveform processed according to one aspect of the present disclosure.

Received audio data may be sent to the AFE 216 for processing. The AFE 216 may reduce noise in the audio data, identify parts of the audio data containing speech for processing, and segment and process the identified speech components. The AFE 216 may divide the digitized audio data into frames, with each frame representing a time interval, for example 10 milliseconds (ms). During that frame the AFE 216 determines a set of values, called a feature vector, representing the features/qualities of the utterance portion within the frame. Feature vectors may contain a varying number of values, for example forty. The feature vector may represent different qualities of the audio data within the frame. FIG. 3 shows a digitized audio data waveform 302, with multiple points 306 of the first word 304 as the first word 304 is being processed. The audio qualities of those points may be stored into feature vectors. Feature vectors may be streamed or combined into a matrix that represents a time period of the spoken utterance. These feature vector matrices may then be passed to the speech recognition engine 218 for processing. A number of approaches may be used by the AFE 216 to process the audio data. Such approaches may include using mel-frequency cepstral coefficients (MFCCs), perceptual linear predictive (PLP) techniques, neural network feature vector techniques, linear discriminant analysis, semi-tied covariance matrices, or other approaches known to those of skill in the art.

Processed feature vectors may be output from the ASR module 214 and sent to the input/output device 206 for transmission to another device for further processing. The feature vectors may be encoded and/or compressed by the encoder/decoder 222 prior to transmission. The encoder/decoder 222 may be customized for encoding and decoding ASR data, such as digitized audio data, feature vectors, etc. The encoder/decoder 222 may also encode non-ASR data of the ASR device 202, for example using a general encoding scheme such as .zip, etc. The functionality of the encoder/decoder 222 may be located in a separate component, as illustrated in FIG. 2, or may be executed by the controller/processor 208, ASR module 214, or other component, for example.

The speech recognition engine 218 may process the output from the AFE 216 with reference to information stored in the speech storage 220. Alternatively, post front-end processed data (such as feature vectors) may be received by the ASR module 214 from another source besides the internal AFE 216. For example, another entity may process audio data into feature vectors and transmit that information to the ASR device 202 through the input/output device(s) 206. Feature vectors may arrive at the ASR device 202 encoded, in which case they may be decoded (for example by the encoder/decoder 222) prior to processing by the speech recognition engine 218.

The speech storage 220 includes a variety of information for speech recognition such as data matching pronunciations of phonemes to particular words. This data may be referred to as an acoustic model. The speech storage may also include a dictionary of words or a lexicon. The speech storage may also include data describing words that are likely to be used together in particular contexts. This data may be referred to as a language or grammar model. The speech storage 220 may also include a training corpus that may include recorded speech and/or corresponding transcription, that may be used to train and improve the models used by the ASR module 214 in speech recognition. The training corpus may be used to train the speech recognition models, including the acoustic models and language models, in advance. The models may then be used during ASR processing.

The training corpus may include a number of sample utterances with associated feature vectors and associated correct text that may be used to create, for example, acoustic models and language models. The sample utterances may be used to create mathematical models corresponding to expected audio for particular speech units. Those speech units may include a phoneme, syllable, part of a syllable, word, etc. The speech unit may also include a phoneme in context such as a triphone, quinphone, etc. Phonemes in context used regularly in speech may be associated with their own models. Phonemes in context that are less common may be clustered together to have a group model. By clustering phoneme groups in this manner, fewer models may be included in the training corpus, thus easing ASR processing. The training corpus may include multiple versions of the same utterance from different speakers to provide different utterance comparisons for the ASR module 214. The training corpus may also include correctly recognized utterances as well as incorrectly recognized utterances. These incorrectly recognized utterances may include grammar errors, false recognition errors, noise, or other errors that provide the ASR module 214 with examples of error types and corresponding corrections, for example.

Other information may also be stored in the speech storage 220 for use in speech recognition. The contents of the speech storage 220 may be prepared for general ASR use or may be customized to include sounds and words that are likely to be used in a particular application. For example, for ASR processing at an ATM (automated teller machine), the speech storage 220 may include customized data specific to banking transactions. In certain instances the speech storage 220 may be customized for an individual user based on his/her individualized speech input. To improve performance, the ASR module 214 may revise/update the contents of the speech storage 220 based on feedback of the results of ASR processing, thus enabling the ASR module 214 to improve speech recognition beyond the capabilities provided in the training corpus.

The speech recognition engine 218 attempts to match received feature vectors to language phonemes and words as known in the speech storage 220. The speech recognition engine 218 computes recognition scores for the feature vectors based on acoustic information and language information. The acoustic information is used to calculate an acoustic score representing a likelihood that the intended sound represented by a group of feature vectors match a language phoneme. The language information is used to adjust the acoustic score by considering what sounds and/or words are used in context with each other, thereby improving the likelihood that the ASR module outputs speech results that make sense grammatically.

The speech recognition engine 218 may use a number of techniques to match feature vectors to phonemes. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 218, the state may change or stay the same, based on the processing of the new feature vectors. A Viterbi algorithm may be used to find the most likely sequence of states based on the processed feature vectors.

Figure 4:
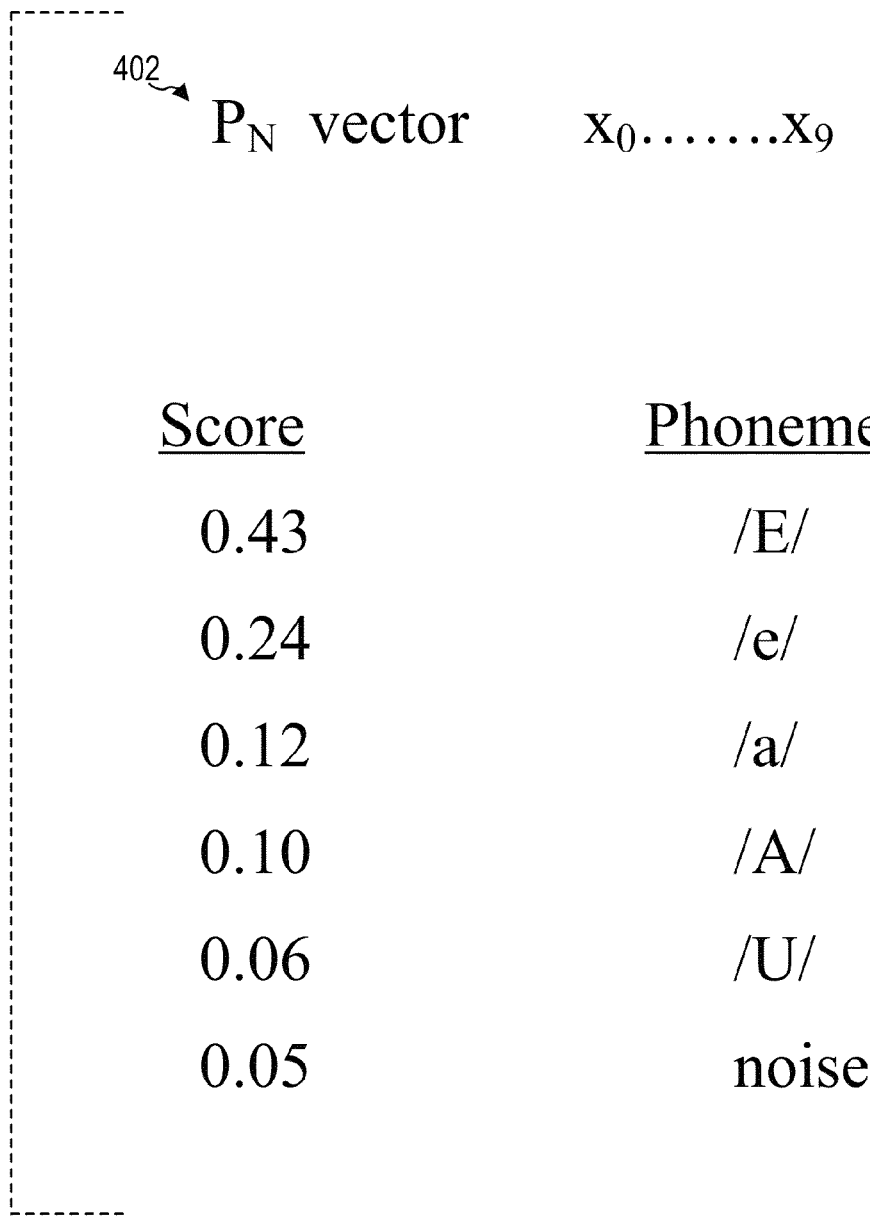
FIG. 4 illustrates phoneme processing according to one aspect of the present disclosure.

In one example, the speech recognition engine 218 may receive a series of feature vectors for sound corresponding to a user saying "Hello, how are you today?" The speech recognition engine 218 may attempt to match each feature vector with a phoneme in the speech recognition database 220. For example, FIG. 4 shows a series of feature vectors 402 corresponding to phoneme $P_N$ (representing the "e" sound in "hello"), including ten feature vectors $X_0$ through $X_9$. Upon processing of the first feature vector, the speech recognition engine 218 makes a preliminary determination as to the probability that the feature vector matches a phoneme, shown as the score in FIG. 4. Based on the feature vector, the phoneme /E/ may be assigned an initial score of 0.43, phoneme /e/ (a different pronunciation from /E/) may be assigned a score of 0.24, etc. The score may be based on how closely the feature vector matches a distribution associated with a phoneme state within one or more acoustic models stored in the speech storage 220. A feature vector may also be assigned a score that the feature vector represents noise or silence. In the example of FIG. 4, the score that the feature vector represents noise is 0.05.

Figure 5:
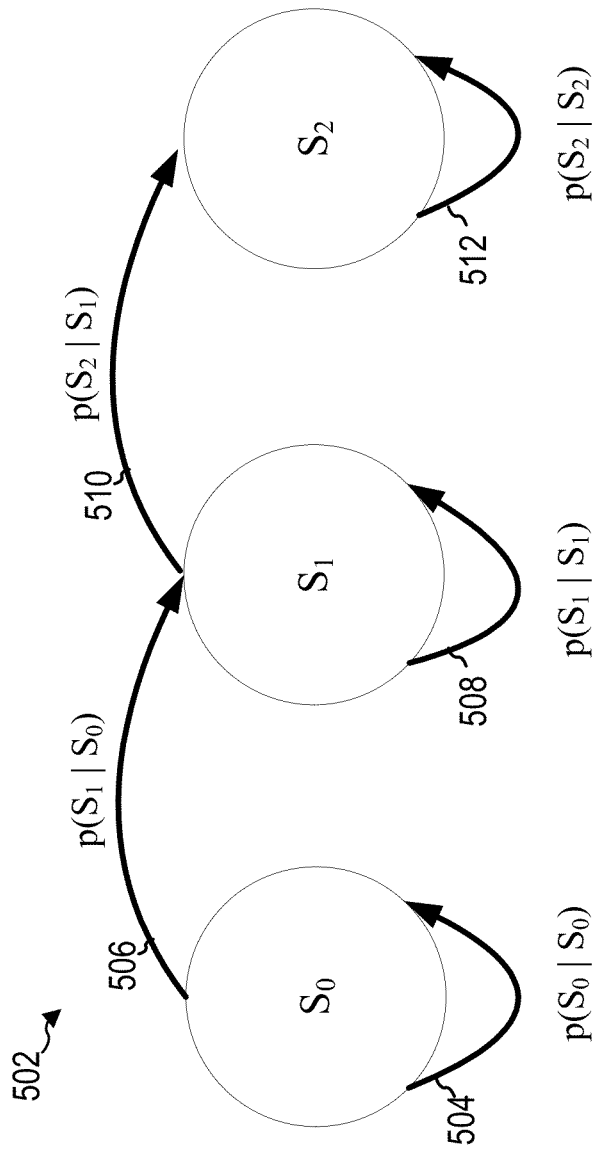
FIG. 5 illustrates phoneme processing in a Hidden Markov Model according to one aspect of the present disclosure.

Taking the example of the feature vector with a score of 0.43 for the phoneme /E/ shown in FIG. 4, the speech recognition engine 218 initially assigns a score of 0.43 that the feature vector matches the first state of the phoneme /E/, shown as state $S_0$ in the Hidden Markov Model illustrated in FIG. 5. After further processing, the speech recognition engine 218 determines whether the state should either remain the same, or change to a new state. For example, whether the state should remain the same 504 may depend on the corresponding transition probability (written as $P(S_0|S_0)$, meaning the probability of going from state $S_0$ to $S_0$) and how well the subsequent frame matches states $S_0$ and $S_1$. If state $S_1$ is the most probable, the calculations move to state $S_1$ and continue from there. For subsequent frames, the speech recognition engine 218 similarly determines whether the state should remain at $S_1$, using the transition probability represented by $P(S_1|S_1)$ 508, or move to the next state, using the transition probability $P(S_2|S_1)$ 510. As the processing continues, the speech recognition engine 218 continues calculating such probabilities including the probability 512 of remaining in state $S_2$ or the probability of moving from a state of illustrated phoneme /E/ to a state of another phoneme. After processing the feature vectors for state $S_2$, the speech recognition may move to the next phoneme in the utterance.

The probabilities and states may be calculated using a number of techniques. For example, probabilities for each state may be calculated using a Gaussian model, Gaussian mixture model, or other technique based on the feature vectors and the contents of the speech storage 220. Techniques such as maximum likelihood estimation (MLE) may be used to build the acoustic model.

In addition to calculating potential states for one phoneme as a potential match to a feature vector, the speech recognition engine 218 may also calculate potential states for other phonemes, such as phoneme /e/ and/or phoneme /a/ for the example shown in FIG. 4 as potential matches for the feature vector. In this manner multiple states and state transition probabilities may be calculated.

The probable states and probable state transitions calculated by the speech recognition engine 218 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The speech recognition engine 218 may also compute scores of branches of the paths based on language models or grammars. Language modeling involves determining scores for what words are likely to be used together to form coherent words and sentences. Application of a language model may improve the likelihood that the ASR module 214 correctly interprets the speech contained in the audio data. For example, acoustic model processing returning the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance. The language modeling may be determined from a training corpus stored in the speech storage 220 and may be customized for particular applications. Language models may be performed using techniques such as an N-gram model where a probability of seeing a particular next word depends on the context history of the preceding n−1 words. N-gram models may also be structured as bigram (where n=2) and trigram (where n=3) models where the probability of seeing a next word depends on the previous word (in the case of a bigram model) or on the previous two words (in the case of a trigram model).

Figure 6:
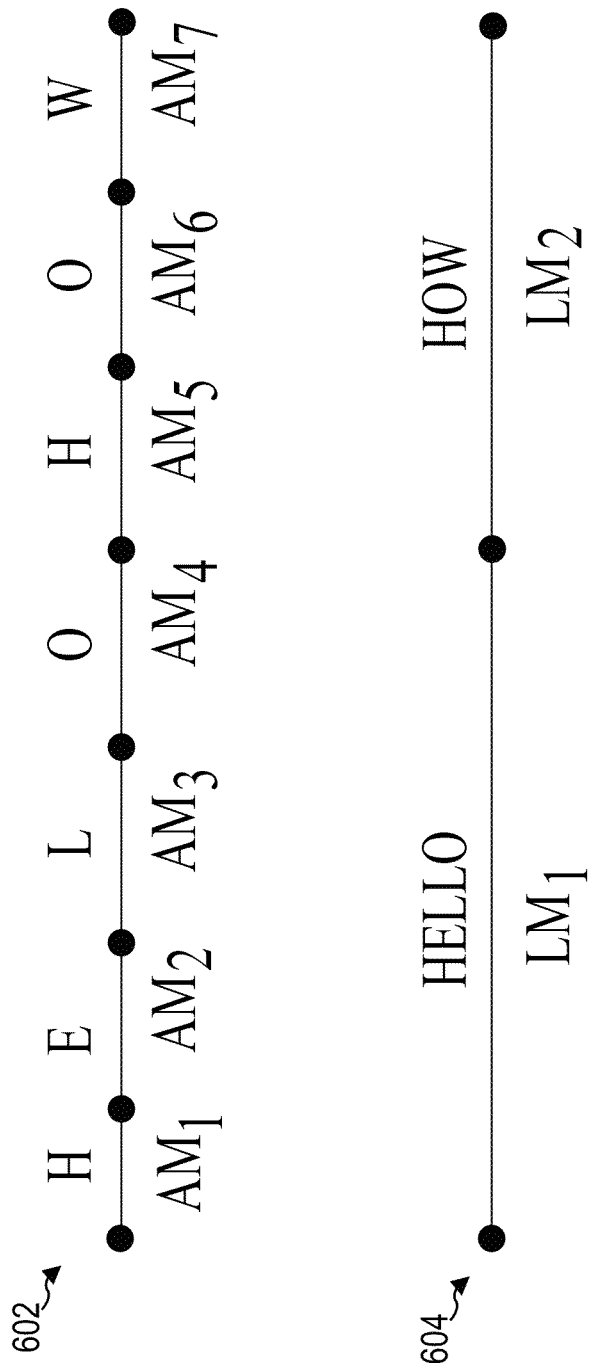
FIG. 6 illustrates phoneme processing and word processing according to one aspect of the present disclosure.

FIG. 6 illustrates the relationship between acoustic modeling and language modeling. As illustrated, each processed phoneme included in the path 602 is associated with an acoustic model score $AM_1$ through $AM_7$. The language model is then applied to associate each word in the path 604 with a language model score $LM_1$ or $LM_2$.

As part of the language modeling (or in other phases of the ASR processing) the speech recognition engine 218 may, to save computational resources, prune and discard low recognition score states or paths that have little likelihood of corresponding to the spoken utterance, either due to low recognition score pursuant to the language model, or for other reasons. Further, during the ASR processing the speech recognition engine 218 may iteratively perform additional processing passes on previously processed utterance portions. Later passes may incorporate results of earlier passes to refine and improve results.

Figure 7:
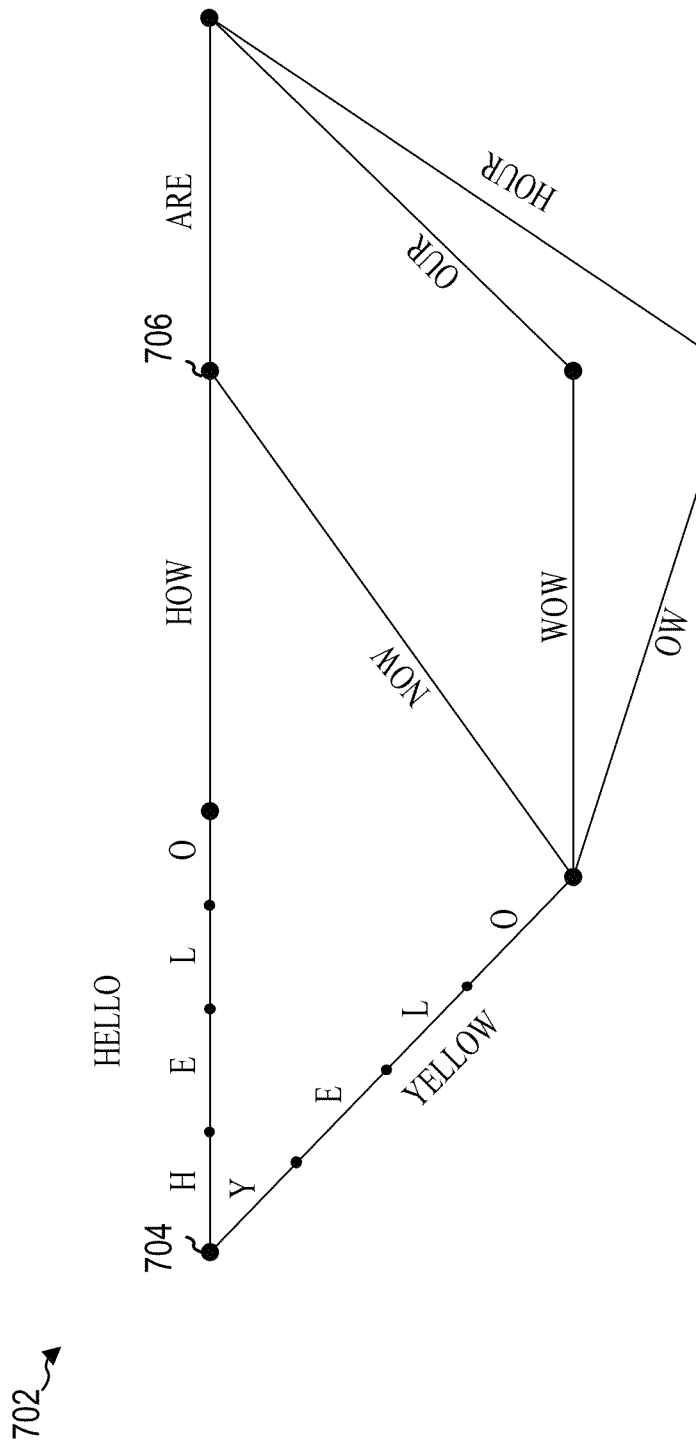
FIG. 7 illustrates a speech recognition lattice according to one aspect of the present disclosure.

The speech recognition engine 218 may combine potential paths into a lattice representing speech recognition results. A sample lattice is shown in FIG. 7. The lattice 702 shows multiple potential paths of speech recognition results. Paths between large nodes represent potential words (for example "hello", "yellow", etc.) and paths between smaller nodes represent potential phonemes (for example "H", "E", "L", "0" and "Y", "E", "L", "0"). For purposes of illustration, individual phonemes are only shown for the first two words of the lattice. The two paths between node 704 and node 706 represent two potential word choices, "hello how" or "yellow now". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the speech recognition engine 218 as the ASR result for the associated feature vectors. The speech recognition engine 218 may also return a lattice or an N-best list of paths along with their respective recognition scores, corresponding to the top N paths as determined by the speech recognition engine 218.

Following ASR processing, the ASR results may be sent by the ASR module 214 to another component of the ASR device 202, such as the controller/processor 208 for further processing (such as execution of a command included in the interpreted text) or to the input/output device 206 for sending to an external device.

Figure 8:
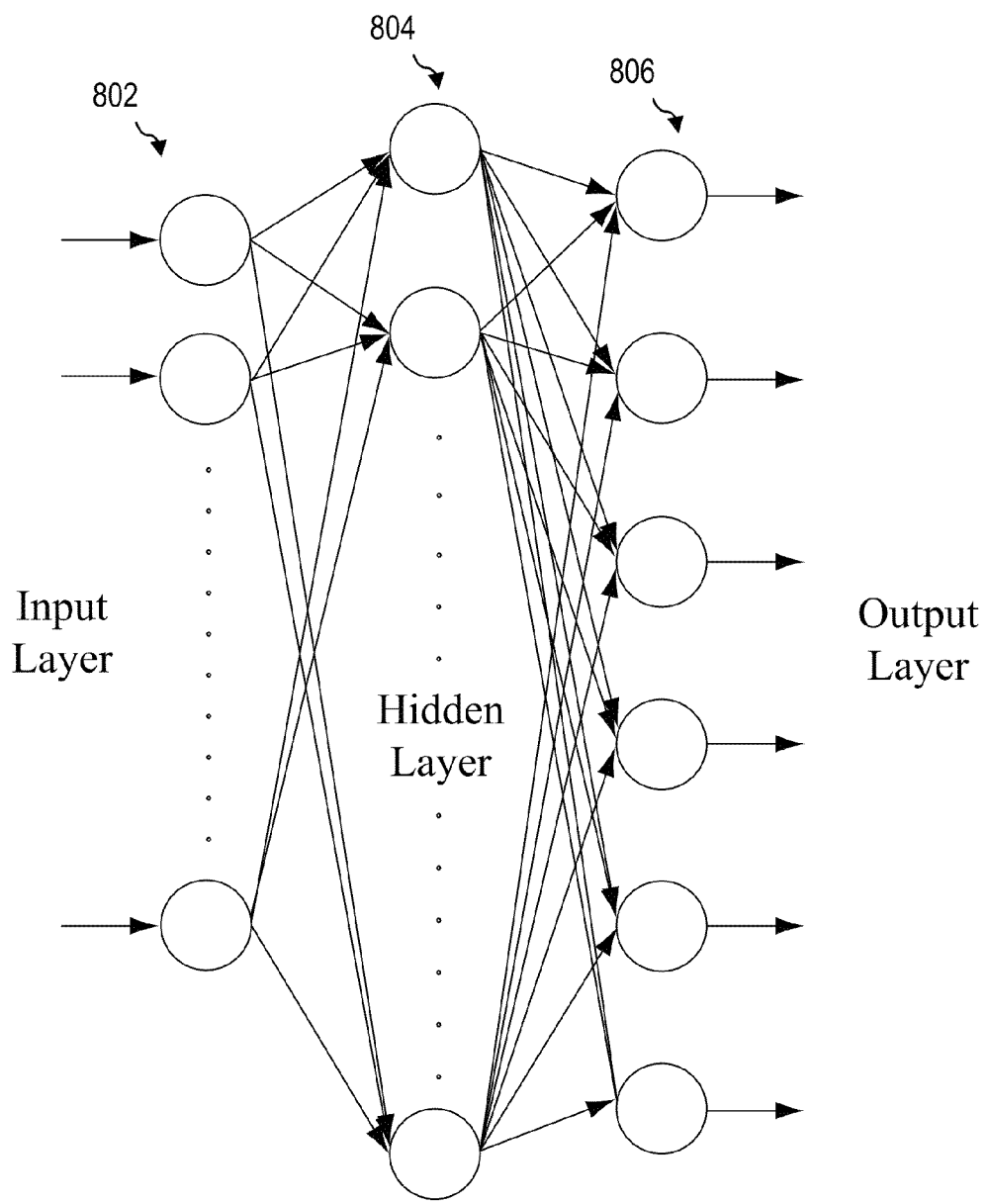
FIG. 8 illustrates a neural network for speech recognition according to one aspect of the present disclosure.

Neural networks may also be used to perform ASR processing including acoustic model processing and language model processing. An example neural network for ASR is illustrated in FIG. 8. A neural network may be structured with an input layer 802, a middle layer 804, and an output layer 806. The middle layer may also be known as the hidden layer. Each node of the hidden layer is connected to each node in the input layer and each node in the output layer. Although illustrated in FIG. 8 with a single hidden layer, a neural network may include multiple middle layers. In this case each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

Figure 9:
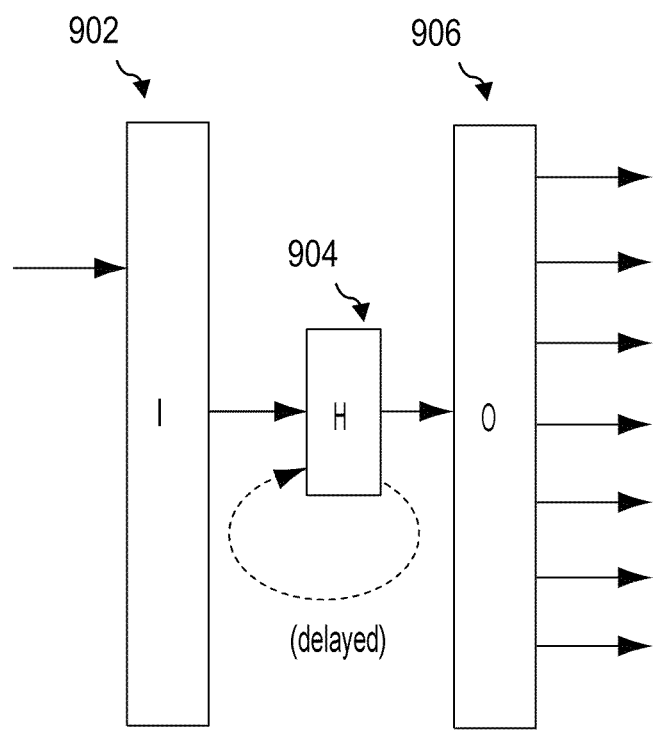
FIG. 9 illustrates a neural network for speech recognition according to one aspect of the present disclosure.

In one aspect, the neural network may be constructed with recurrent connections such that the output of the hidden layer of the network feeds back into the hidden layer again for the next set of inputs. Such a neural network is illustrated in FIG. 9. Each node of the input layer 902 connects to each node of the hidden layer 904. Each node of the hidden layer 904 connects to each node of the output layer 906. As illustrated, the output of the hidden layer 904 is fed back into the hidden layer for processing of the next set of inputs.

In the case where an acoustic model uses a neural network, each node of the neural network input layer may represents an acoustic feature of a feature vector of acoustic features, such as those that may be output by AFE 216, and each node of the output layer represents a score corresponding to a subword unit (such as a phoneme, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 9, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. Training of a neural network typically only occurs ahead of time, meaning a neural network is trained and then deployed to an ASR system to perform whatever function is called for, such as acoustic modeling, language modeling, etc.

One drawback to this traditional training approach is that a neural network that is already in place in a system may not be able to update its weights without being retrained or replaced during a period of downtime. This may lead to neural network inflexibility, as well as undesired results if speech recognition conditions change prior to the neural network being updated. Such changes in speech recognition may include a change in environmental conditions effecting sound processing (which may require adjustment of an acoustic model), new words becoming more frequent in a spoken lexicon (and thus should be chosen more often by a language model), or the like.

Offered is an approach to create an adaptive neural network by training the neural network while it is online, meaning while it is operating and performing speech recognition. A neural network for speech recognition (such as an acoustic model neural network or language model neural network) may perform speech recognition operations and take the results from the speech recognition operations and feedback those results into the neural network as target outputs (also target inputs for neural networks performing language modeling) to adjust the internal weights of the neural network. Following processing by neural network components, another component of an ASR, such as a decoder may output ASR results as a lattice, weighted N-best list, etc. Such ASR outputs, and their corresponding scores, may be used to train ASR neural networks. This training update may occur as speech recognition processing is ongoing, such as in between speech recognition passes, to update neural network weights while the neural network is online. Thus, the speech recognition output may be used to further train the neural network(s) that performed the processing to adjust the existing weights of that neural network and improve recognition for future audio. Other potential outputs may be used for online training such as the highest scoring path through the speech recognition output lattice (1-best), etc. The individual outputs used to train the neural network(s) may be associated with a confidence score representing a confidence the ASR system has regarding the particular output. Confidence scores may be incorporated into neural network training, such as less heavily updating a neural network weight for ASR outputs with lower confidence scores.

For example, a neural network language model may be updated based on the lattice output from a speech recognition system. Each words in the lattice may have an associated score. The sequences of words along the different paths in the lattice can be used as training data for the neural network language model and allow the neural network weights to be updated prior to its next processing pass. The training targets can be done in the typical way with only one word having a weight larger than zero, or by allowing weights between 0 and 1 for the output targets by examining all possible next words from the current point on the best-path through the lattice. In this manner the neural network may be trained on multiple potential paths at once, rather than trained on single "best" target paths one at a time. The neural networks may also be updated during runtime, that is while the neural networks are implemented on a device and capable of performing ASR processing. Being able to update the neural networks substantially in real time allows the neural networks to more rapidly adjust to changing communication conditions (such as those that might affect an acoustic model, language model, etc.). The neural network updater module 230 may update the neural networks without having to retrain the neural networks offline in a traditional fashion.

While using potentially incorrect ASR and/or neural network outputs, as opposed to specially configured training data sets, may result in a neural network being trained on data segments that may not be correct, performing training using a lattice, weighted N-best list, or other ASR and/or neural network outputs which include weights other than 0 and 1 as used in standard training allows for more nuanced adjustments of existing neural network weights. Weights that are not 0 and 1 may be referred to as fuzzy weights. The richer sets of information and confidences allow several weighted training examples to be used at the same time during each re-training/update of the network weights. Further, updating a neural network while online allows adjustment of a neural network without having to take the network down for replacement/updating as a result of new training data. In this manner a neural network may be trained online based on a number of potential or adaptive weights estimated by the recent history of data processed during runtime rather than pre-set optimal weights as specified in a proscribed set of training data.

While online training of neural networks may typically take time to result in user noticeable changes to ASR processing, in certain aspects such online training may be configured in a manner which results in rapid training of neural networks. For example, a neural network may be adapted for a short term decay where neural network weights may be configured to be an initial training value plus an offset which decays at a configured rate. If such an offset is heavily weighted, very recent processing conditions may heavily impact ASR processing done by a neural network. For example, a user inputs a first spoken utterance into a device while indoors in a relatively quiet environment. The output of the speech recognition system may be used to retrain the acoustic model neural network based on processing of this first spoken utterance. The user then steps outside to a noisy environment and inputs a second spoken utterance into the device. The output of an acoustic model neural network may be used to retrain the acoustic model neural network based on processing of the second spoken utterance. The acoustic model may now be slightly adjusted for the different sounds that accompany the noisy environment. While still outside, the user then inputs a third spoken utterance into the device. The processing of this third spoken utterance by the acoustic model neural network may have slightly more accurate results due to the updating of the acoustic model neural network after processing of the second spoken utterance.

An example of how online training may apply for an language model neural network is illustrated as follows. A language model neural network may be trained on an initial set of training data that is generalized across a wide user base and then installed in multiple devices, such as in a smartphone, tablet, etc. A particular user, however, may use certain words quite frequently that would otherwise be used infrequently by the wide user base. By retraining a language model neural network while online, the language model neural network may adjust its internal weights to recognize that the words favored by the particular user may be given a higher weight than originally assigned during initial training. This will lead to improved speech recognition performance for the particular user. This training may involve a short term decay, such as that described above, to heavily weight recent updates, or may retrain the language model neural network without the decay.

A language model neural network may predict a next word based on several weighted words from a lattice for the prior N-best paths, similar to an N-gram described above. For an acoustic model neural network, the target output for a frame may include probabilities of each phone-state based on the output lattice. Each output lattice may be used to retrain the neural network for the next pass. Thus each pass through the neural network may incorporate the retraining from previous passes.

Neural networks may be retrained in this fashion based on varying time scales. For example, a neural network may be retrained in batches, such as retraining the neural network after 10-20 passes through the network. In another example, a neural network may be retrained after every acoustic frame processed. In another example, a neural network may be retrained after processing each word, each utterance, etc. The time scale for retraining may be configured as desired.

Figure 10:
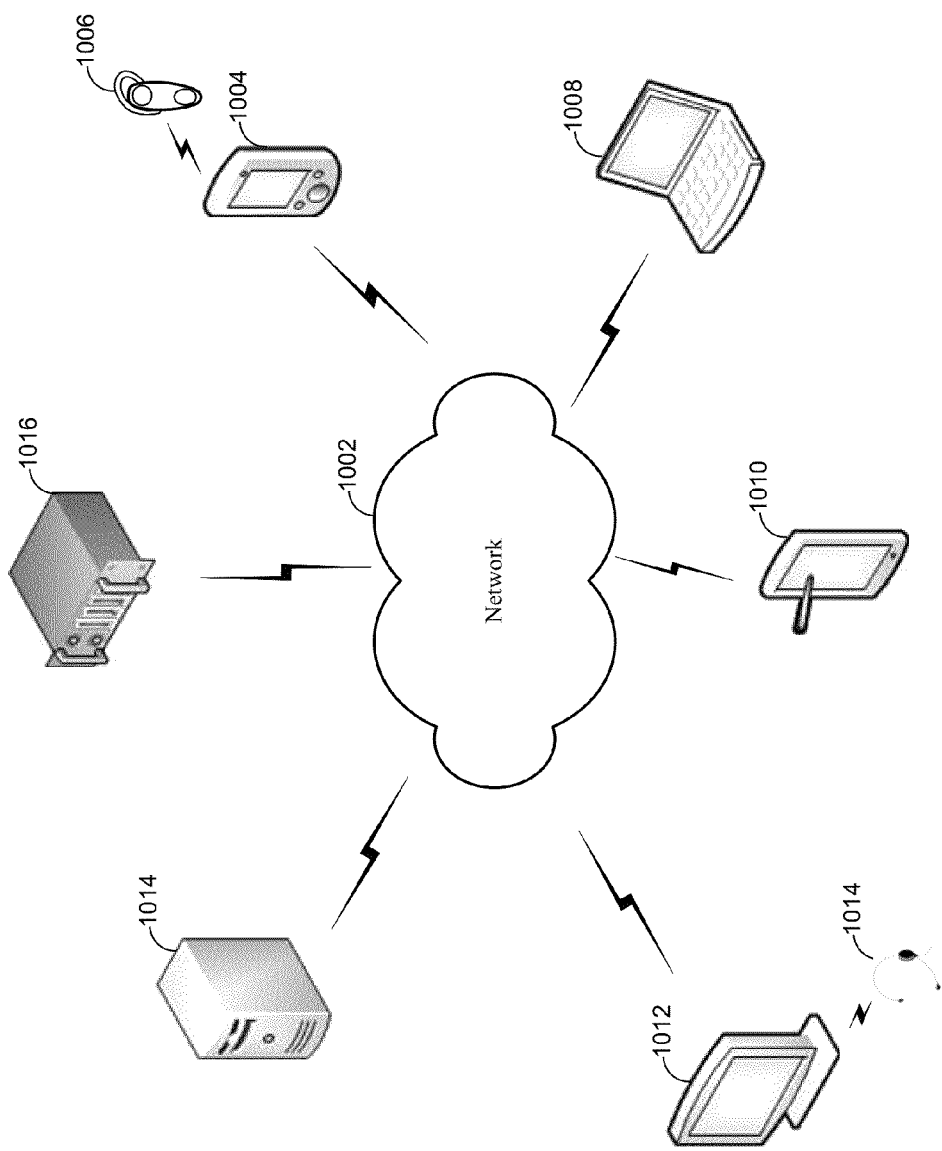
FIG. 10 illustrates a computer network for use with distributed speech recognition according to one aspect of the present disclosure.

In one aspect, neural network retraining may take place in a distributed ASR system. For example, multiple ASR devices 202 may be connected over a network. As shown in FIG. 10 multiple devices may be connected over network 1002. Network 1002 may include a local or private network or may include a wide network such as the internet. Devices may be connected to the network 1002 through either wired or wireless connections. For example, a wireless device 1004 may be connected to the network 1002 through a wireless service provider. Other devices, such as computer 1012, may connect to the network 1002 through a wired connection. Other devices, such as laptop 1008 or tablet computer 1010 may be capable of connection to the network 1002 using various connection methods including through a wireless service provider, over a WiFi connection, or the like. Networked devices may input spoken audio through a number of audio input devices including through headsets 1006 or 1014. Audio input devices may be connected to networked devices either through a wired or wireless connection. Networked devices may also include embedded audio input devices, such as an internal microphone (not pictured) in laptop 1008, wireless device 1004 or table computer 1010.

In certain ASR system configurations, one device may capture an audio signal and another device may perform the ASR processing. For example, audio input to the headset 1014 may be captured by computer 1012 and sent over the network 1002 to computer 1014 or server 1016 for processing. Or computer 1012 may partially process the audio signal before sending it over the network 1002. Because ASR processing may involve significant computational resources, in terms of both storage and processing power, such split configurations may be employed where the device capturing the audio has lower processing capabilities than a remote device and higher quality ASR results are desired. In one aspect, the audio capture may occur near a user and the captured audio signal sent to another device for processing. In another aspect, speech recognition results used to train a neural network may be received by a remote device for training the neural network of a local device. In another aspect, speech recognition results may be sent from a local device to a remote device and used to train a neural network of the remote device or sent by the remote device to other remote devices to train the neural networks of those devices.

For example, in certain circumstances a word may become more frequently used by a wide user base, as determined by a remote device or other system which tracks word frequency across multiple users/devices. The word may be the name of a recently famous person, a new television program, etc. Using information gathered from one or more user devices a remote device may gather speech recognition results (such as lattices, N-best lists, etc.) related to the specific word and send those results to local devices for the local devices to use in retraining ASR neural networks while online. In certain aspects the remote device may determine which local devices are likely to encounter the word, and send the data only to those devices. In another aspect, certain local devices may query a remote device for neural network updates that may be applicable to the user of the local device. In this manner multiple users may benefit from updates to neural networks made to other users.

When training neural networks during run time, particular biases of a neural network (such as a tendency to make a certain kind of error during processing) may inadvertently be reinforced instead of corrected. Such reinforcement may happen by virtue of the neural network's potentially incorrect outputs being used to retrain the neural network's behavior. To counter this effect, various internal weights of ASR results may be adjusted. For example, when updating an acoustic model, a system may add a higher weight to a language model portion of ASR results. Similarly, when updating a language model, a system may add a higher weight to an acoustic model portion of ASR results.

Figure 11:
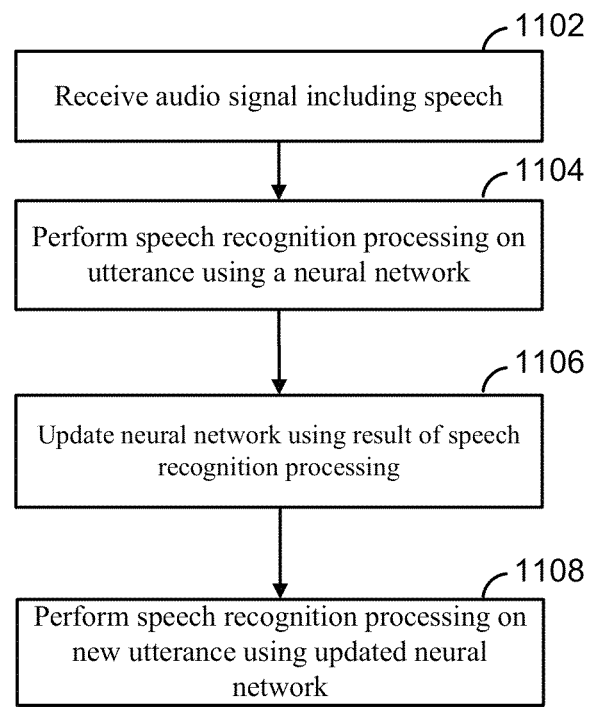
FIG. 11 illustrates performing speech recognition with adaptive neural networks according to one aspect of the present disclosure.

In one aspect of the present disclosure, a device may perform ASR using adaptive neural networks as illustrated in FIG. 11. An ASR device may receive audio including speech, as shown in block 1102. The speech may include one or more utterances. The ASR device may perform ASR processing on an utterance using a neural network, as shown in block 1104. The neural network may be an acoustic model neural network or a language model neural network. The ASR device may produce an output, such as a lattice, weighted N-best list, etc. The output may then be used to update the neural network, as shown in block 1106. The updated neural network may then be used to perform ASR processing on a new utterance, as shown in block 1108.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the ASR techniques described herein may be applied to many different languages, based on the language information stored in the speech storage.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A method of updating speech recognition neural networks, the method comprising:
   receiving a first audio signal comprising a first speech utterance;
   performing speech recognition on the first audio signal based at least in part on an acoustic model neural network to obtain a lattice of speech recognition results, wherein the lattice comprises a first path associated with a first score a second path associate with a second score;
   updating first weights of the acoustic model neural network substantially in real time, wherein updating the first weights comprises performing a first update using information associated with the first path and performing a second update using information associated with the second path;
   receiving a second audio signal comprising a second speech utterance; and
   performing speech recognition on the second audio signal based at least in part on the acoustic model neural network and the updated first weights.

2. The method of claim 1
   wherein performing speech recognition on the first audio signal is further based at least in part on a language model neural network;
   the method further comprising updating second weights of the language model neural network substantially in real time, wherein updating the second weights comprises performing a third update using information associated with the first path and performing a fourth update using information associated with the second path; and
   wherein performing speech recognition on the second audio signal is further based at least in part on the language model neural network and the updated weights of the language model neural network.

3. The method of claim 1, further comprising:
   computing a feature vector from the first audio signal;
   determining a hidden Markov model state associated with the feature vector from the first path of the lattice of speech recognition results; and
   wherein updating the first weights of the acoustic model neural network comprises using the feature vector as an input to the acoustic model neural network and the hidden Markov model state as an output to the acoustic model neural network.

4. The method of claim 1, wherein updating the first weights of the acoustic model neural network using information associated with the first path comprises using a first confidence score associated with the first path.

5. A computing device, comprising:
   at least one processor;
   a memory device including instructions operable to be executed by the at least one processor to perform a set of actions, configuring the at least one processor:
   to receive an audio signal;

to perform speech recognition processing on the audio signal using a neural network to obtain speech recognition results; and to update the neural network during runtime based at least in part on the speech recognition results.

6. The computing device of claim 5, wherein the neural network comprises at least one of an acoustic model neural network or a language model neural network.

7. The computing device of claim 5, wherein the processor is further configured to, during the runtime:

determine a path of the neural network during the speech recognition processing, the path having a weight;

perform the speech recognition processing on the audio signal using the path to determine the speech recognition results, the speech recognition results comprising a confidence score;

update the neural network by adjusting the weight using the confidence score to obtain an adjusted weight;

receive a second audio signal; and perform second speech recognition processing on the second audio signal using the adjusted weight.

8. The computing device of claim 7, wherein the speech recognition results comprise a lattice, wherein the confidence score is associated with a path of the lattice.

9. The computing device of claim 5, wherein the speech recognition results comprises a lattice, the lattice having a first path associated with a first score and a second path associated with a second score and the first path and second path representing different potential interpretations of the audio data, and wherein the at least one processor is configured to update the neural network by updating a plurality of weights of the neural network using the first score and second score.

10. The computing device of claim 5, wherein the at least one processor is further configured:

to compute a feature vector from the audio signal;

to determine a hidden Markov model state associated with the feature vector from the first result; and wherein the at least one processor configured to update the neural network comprises the at least one processor configured to use the feature vector as an input to the neural network and the hidden Markov model state as an output to the neural network.

11. The computing device of claim 5, wherein the at least one processor is further configured to send the speech recognition results to a remote device.

12. The computing device of claim 5, wherein the at least one processor is further configured to:

receive a plurality of additional audio signals;

perform speech recognition processing on the plurality of audio signals using the neural network;

maintain a counter indicating a number of times the neural network has been used; and update the neural network when the counter passes a configured value.

13. A non-transitory computer-readable storage medium storing processor-executable instructions for controlling a computing device, comprising:

program code to receive an audio signal;

program code to perform speech recognition processing on the audio signal using a neural network to obtain speech recognition results; and program code to update the neural network during runtime based at least in part on the speech recognition results.

14. The non-transitory computer-readable storage medium of claim 13, wherein the neural network comprises at least one of an acoustic model neural network or a language model neural network.

15. The non-transitory computer-readable storage medium of claim 13, further comprising program code to, during the runtime:

determine a path of the neural network during the speech recognition processing, the path having a weight;

perform the speech recognition processing on the audio signal using the path to determine the speech recognition results, the speech recognition results comprising a confidence score;

update the neural network by adjusting the weight using the confidence score to obtain an adjusted weight;

receive a second audio signal; and perform second speech recognition processing on the second audio signal using the adjusted weight.

16. The non-transitory computer-readable storage medium of claim 15, wherein the speech recognition results comprise a lattice, wherein the confidence score is associated with a path of the lattice.

17. The non-transitory computer-readable storage medium of claim 13, wherein the speech recognition results comprises a lattice, the lattice having a first path associated with a first score and a second path associated with a second score and the first path and second path representing different potential interpretations of the audio data, and wherein the at least one processor is configured to update the neural network by updating a plurality of weights of the neural network using the first score and second score.

18. The non-transitory computer-readable storage medium of claim 13, further comprising:

program code to compute a feature vector from the audio signal;

program code to determine a hidden Markov model state associated with the feature vector from the first result; and wherein the program code to update the neural network comprises program code to use the feature vector as an input to the neural network and the hidden Markov model state as an output to the neural network.

19. The non-transitory computer-readable storage medium of claim 13, further comprising program code to send the speech recognition results to a remote device.

20. The non-transitory computer-readable storage medium of claim 13, further comprising:

program code to perform speech recognition processing on the plurality of audio signals using the neural network;

program code to maintain a counter indicating a number of times the neural network has been used; and program code to update the neural network when the counter passes a configured value.

* * * * *